United States Patent [19]
Scelsi et al.

[11] Patent Number: 5,494,138
[45] Date of Patent: Feb. 27, 1996

[54] AIRCRAFT BRAKE TORQUE TRANSFER ASSEMBLY

[75] Inventors: Anthony Scelsi, South Bend; Paul B. Kellner, Mishawaka, both of Ind.

[73] Assignee: AlliedSignal, Inc., Morristown, N.J.

[21] Appl. No.: 324,078

[22] Filed: Oct. 14, 1994

[51] Int. Cl.⁶ ................................................. F16D 55/36
[52] U.S. Cl. ........................................ 188/18 A; 188/71.5
[58] Field of Search .................. 188/18 A, 71.5, 188/264 G, 218 XL, 18 R, 71.6, 264 W, 205 R, 206 R, 366, 367, 73.32; 301/6.2, 6.8, 6.1; 244/111, 110 A, 121; 192/70.16, 70.2, 70.19, 115, 110 B, 70.11

[56] References Cited

U.S. PATENT DOCUMENTS

| | | | |
|---|---|---|---|
| 3,977,631 | 8/1976 | Jenny | 188/71.5 |
| 4,944,370 | 7/1990 | Chambers et al. | 188/71.5 |
| 5,062,503 | 11/1991 | Black et al. | 188/71.5 |
| 5,402,865 | 4/1995 | Harker | 188/71.5 |

FOREIGN PATENT DOCUMENTS 1116047  6/1968  United Kingdom ............... 188/18 A

*Primary Examiner*—Douglas C. Butler
*Attorney, Agent, or Firm*—Larry J. Palguta; Leo H. McCormick, Jr.

[57] ABSTRACT

The aircraft brake torque transfer assembly of a brake (30) comprises an aircraft axle (10) having at one axial location an axle flange (18) flange which includes about the circumference thereof a plurality of teeth members or splines (19). An aircraft wheel (20) is mounted upon a set of roller bearing assemblies (15, 17) with one roller bearing assembly engaging a nut assembly (14). The other roller bearing assembly (17) maintains in axial position a bushing assembly (21) and a foot (25) of a torque tube (24) which abuts against the axle flange (18). The aircraft brake (30) includes a piston housing (35) attached to the torque tube (24), and the torque tube (24) includes a plurality of openings (27) receiving bolts (60) with nuts (64) to attach a retention ring (50) to the torque tube (24). The retention ring (50) includes a central, generally annular opening (51) with a plurality or teeth or splines (54) disposed thereabout. The teeth or splines (54) mesh with the teeth or splines (19) around the circumference of the axle flange (18) to secure abuttingly and nonrotatably the retention ring (50) to the axle flange (18), and thereby secure nonrotatably the torque tube (24) relative to the axle (10). The retention ring (50) includes several engagement members (55, 55A) which enable quick assembly and disassembly with the axle flange (18).

14 Claims, 3 Drawing Sheets

AIRCRAFT BRAKE TORQUE TRANSFER ASSEMBLY

SUMMARY OF THE INVENTION

The present invention relates generally to an aircraft wheel and brake, and in particular to a nonrotatable connection of the torque tube with an axle of the aircraft.

Aircraft wheels and brakes comprise, generally, an aircraft wheel mounted by tapered roller bearings on an aircraft axle, with the bearings and wheel held in place on the axle by means of a nut assembly. Several methods of transferring braking torque from the torque tube to the axle have been utilized in prior designs. For example, in the F-14 brake as illustrated herein in FIGS. 1 and 2, the axle 1 has extending from it three lugs 2, each of which is received within a complementary shaped torque tube recess 3 of the torque tube 4, to provide three anchoring points. The B1A brake includes a trapped torque tube having an internal opening with splines thereabout mating with external splines on the shaft of a torque takeout arm. Also, aircraft such as the NA-180, F-100, F-105 and F-101A utilize a strut axle having a plurality of splines about the exterior surface of the outboard end of the axle mated with splines located within an internal opening of a member of the brake. However, the present invention relates generally to an improvement for the type of construction illustrated in the F-18 wheel and brake. A torque tube is received about the axle and connected by a plurality of bolts and nuts to an axle flange. The torque tube is connected by a key or spline connection to a plurality of stator discs while a plurality of rotor discs are connected by a similar key or spline connection to the rotatable wheel. A piston housing is connected to the torque tube by a series of bolts, or may be connected to the torque tube and axle flange by the same set of bolts and nuts which attach the torque tube to the axle flange. The torque tube may be made of titanium which is an expensive material. Because the bolts and nuts attaching the torque tube to the axle flange create a compressive force by means of the head of the bolt pressing against a radial surface of the axle flange while the nut threadedly attached to the other end of the bolt presses against a radial surface of the torque tube or vice versa, the potential for a shear/friction joint is created. During a brake operation, braking torque is transferred from the stators to the torque tube and axle flange. The torque tube exerts a rotational force relative to the axle flange and because of the compressive forces exerted by the bolt head and nut, the shear/friction joint exists. The shear joint between the axle flange and torque tube causes movement of the shaft of the bolt and this can cause an enlargement or ovalization in the opening of the torque tube because the titanium material of the torque tube is softer than the high strength metal of the axle flange. Also, the wear of titanium torque tube splines in other designs can lead to the undesirable replacement of the torque tube. This can result in the required replacement of the torque tube which, because it is made of titanium, is an undesirable expense. Additionally, the attachment of the torque tube/piston housing to the axle flange by means of bolts and nuts results in considerable time required for removing those parts from the aircraft. It is highly desirable to provide a torque transfer connection or assembly between the torque tube and axle flange which will minimize or eliminate damage to the torque tube (and possibly to the axle flange in some designs), and if replacement of parts is necessary, the parts to be replaced should be less expensive and more easily replaceable than a titanium torque tube. It is also highly desirable to provide an aircraft brake assembly having a torque transfer assembly that provides quick and easy assembly and disassembly in order to minimize changeover time and expense.

The present invention provides solutions to the above by providing a brake torque transfer assembly of a brake, comprising axle means upon which is mounted rotatably a wheel via bearing means, the brake comprising a torque tube maintained at a predetermined axial position adjacent an axle flange of said axle means, a piston housing connected with said torque tube, at least one disc member connected with said torque tube, at least a second disc member connected with said wheel, and the torque tube located nonrotatably relative to the axle means via a retention ring connected with the torque tube and engaging nonrotatably the axle flange of said axle means, the retention ring having internal teeth means engaging teeth means at the circumference of said axle flange.

The invention is described in detail below with reference to the drawings which illustrate embodiments in which.

Other aircraft brake torque transfer assemblies have been disclosed in commonly owned and copending patent application Ser. No. 08/086,214 and U.S. Pat. No. 5,402,865.

Figure 3:
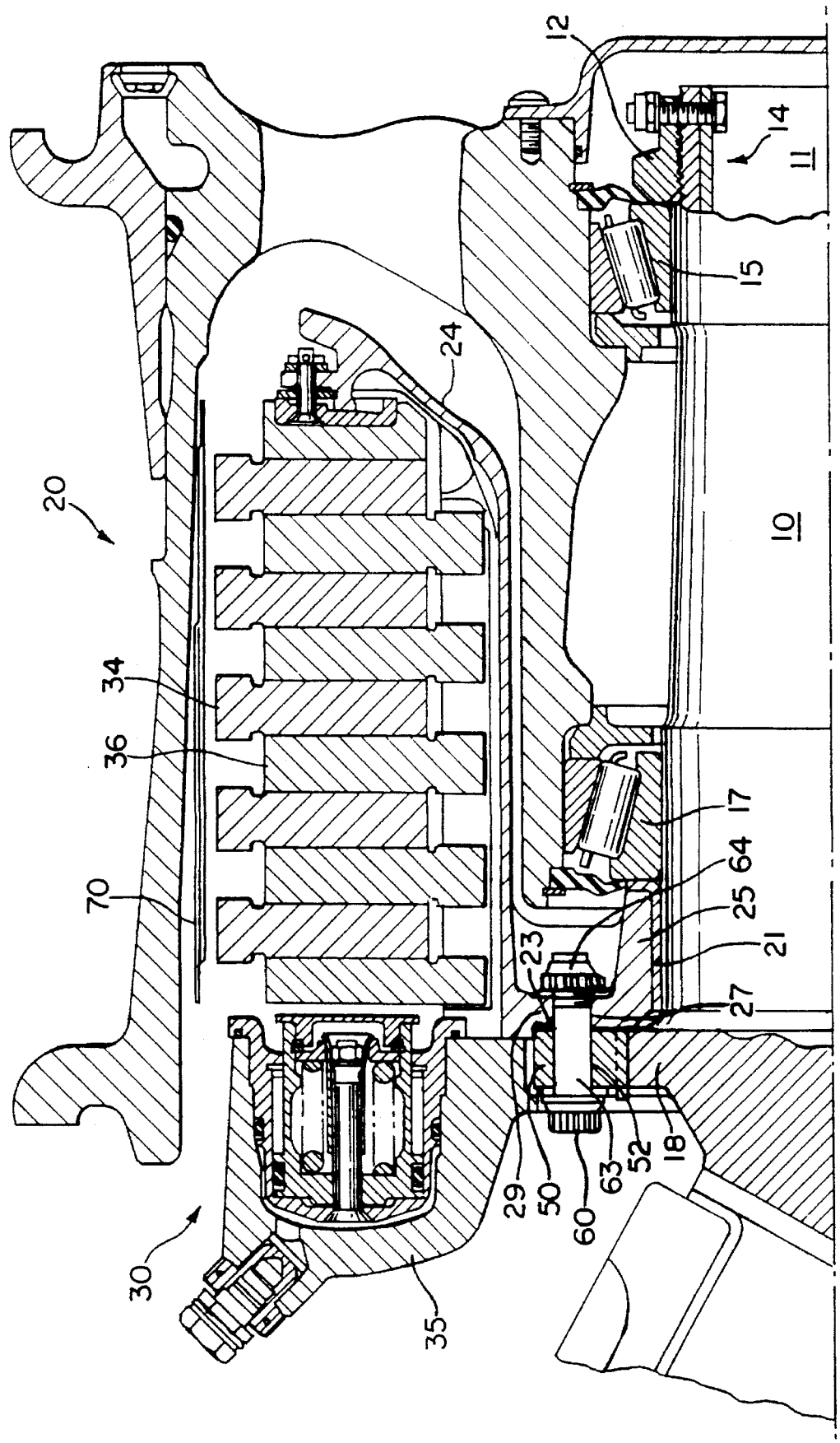
FIG. 3 is a section view of an aircraft axle, wheel and brake illustrating the invention.

FIG. 3 illustrates in section view an aircraft axle, wheel and brake which includes the present invention. Axle or axle means 10 includes at end 11 a nut assembly 14 which includes nut 12. Nut 12 abuts the inner cone of tapered roller bearing assembly 15 that supports rotatably an aircraft wheel indicated generally by reference numeral 20. Aircraft wheel 20 is also supported by tapered roller bearing assembly 17 located at an end of axle 10 which includes axle flange 18. Tapered roller bearing assembly 17 abuts bushing 21 which supports foot 25 of torque tube 24. Bearing assemblies 15, 17 and bushing 21 comprise a bearing means which supports wheel 20 and torque tube 24 on axle 10, respectively. Roller bearing assembly 17 retains operatively, via bushing 21, torque tube: foot 25 in axial engagement with axle flange 18. Thus, torque tube 24 is maintained axially in place by means of the nut assembly 14 which engages roller bearing assembly 15 that engages wheel 20 which engages roller bearing assembly 17 that retains axially in place bushing 21 and torque tube foot 25 that abuts a very thin shim 23 that abuts the axle flange 18. In other words, the nut assembly 14, bearing means (assemblies 15, 17, bushing 21 and shim 23), and wheel 20 maintain the torque tube 24 at a predetermined axial position on axle 10. Shim 23 provides a wear interface between torque tube foot 25 and the small engagement with axle flange 18 and thermal protection for a retention ring 50 and axle 10. Because of the stiffness of shim 23, coulomb or internal shear friction is used to dissipate vibration energy. Although shim 23 experiences some material abrasion, this abrasion is acceptable in view of the elimination of abrasion at the torque tube foot 25 and reduction of abrasion at ring 50/axle flange 18. Shim 23 can be made of single or multiple layers of material with no adhesive between the layers or with such thin layers of adhesive between the layers of material that both designs operatively preclude elastic deformation by or within the shim. Shim 23 is used to protect the adjacent parts from abrasion and to provide heat shielding, rather than to dissipate vibration by converting mechanical energy into heat-via a deformable viscoelastic material as disclosed in U.S. Pat. No. 5,255,761.

Figure 1:
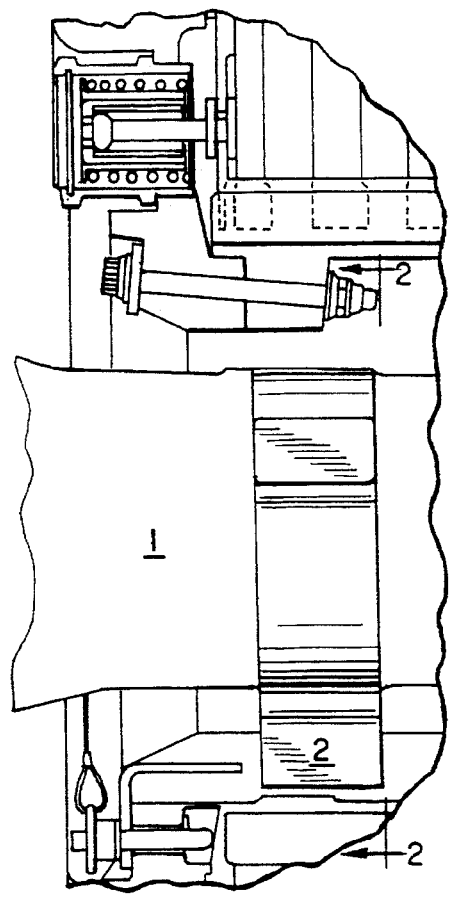
FIG. 1 is a partial section view of an F-14 wheel and brake.
Figure 2:
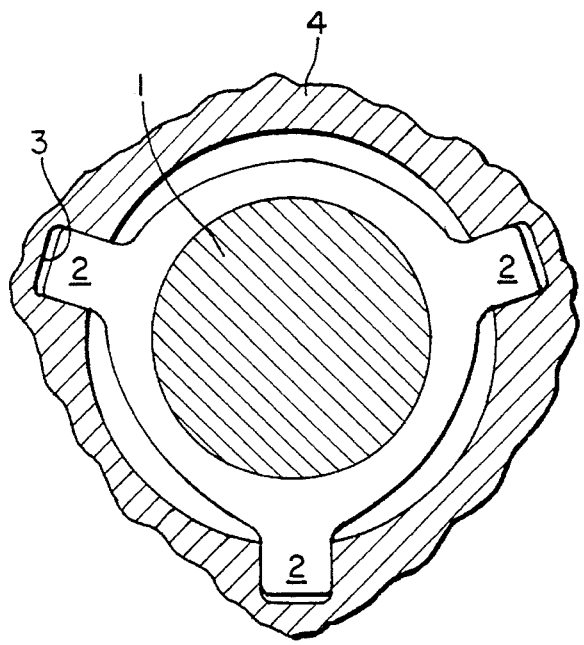
FIG. 2 is a view taken along view line 2—2 of FIG. 1.
Figure 5:
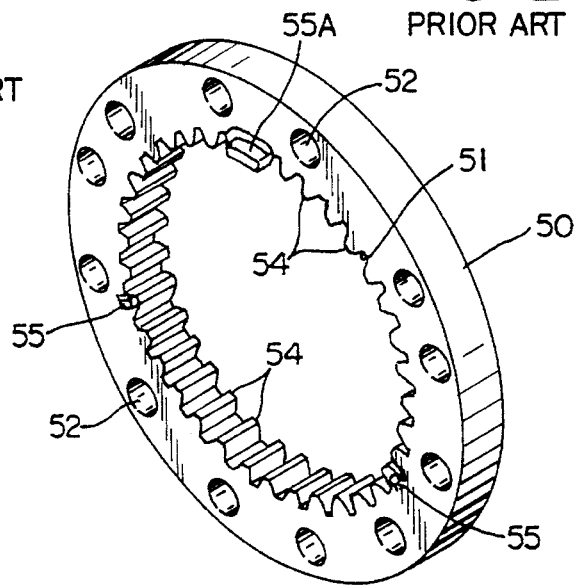
FIG. 5 is an isometric view of the retention ring.
Figure 4:
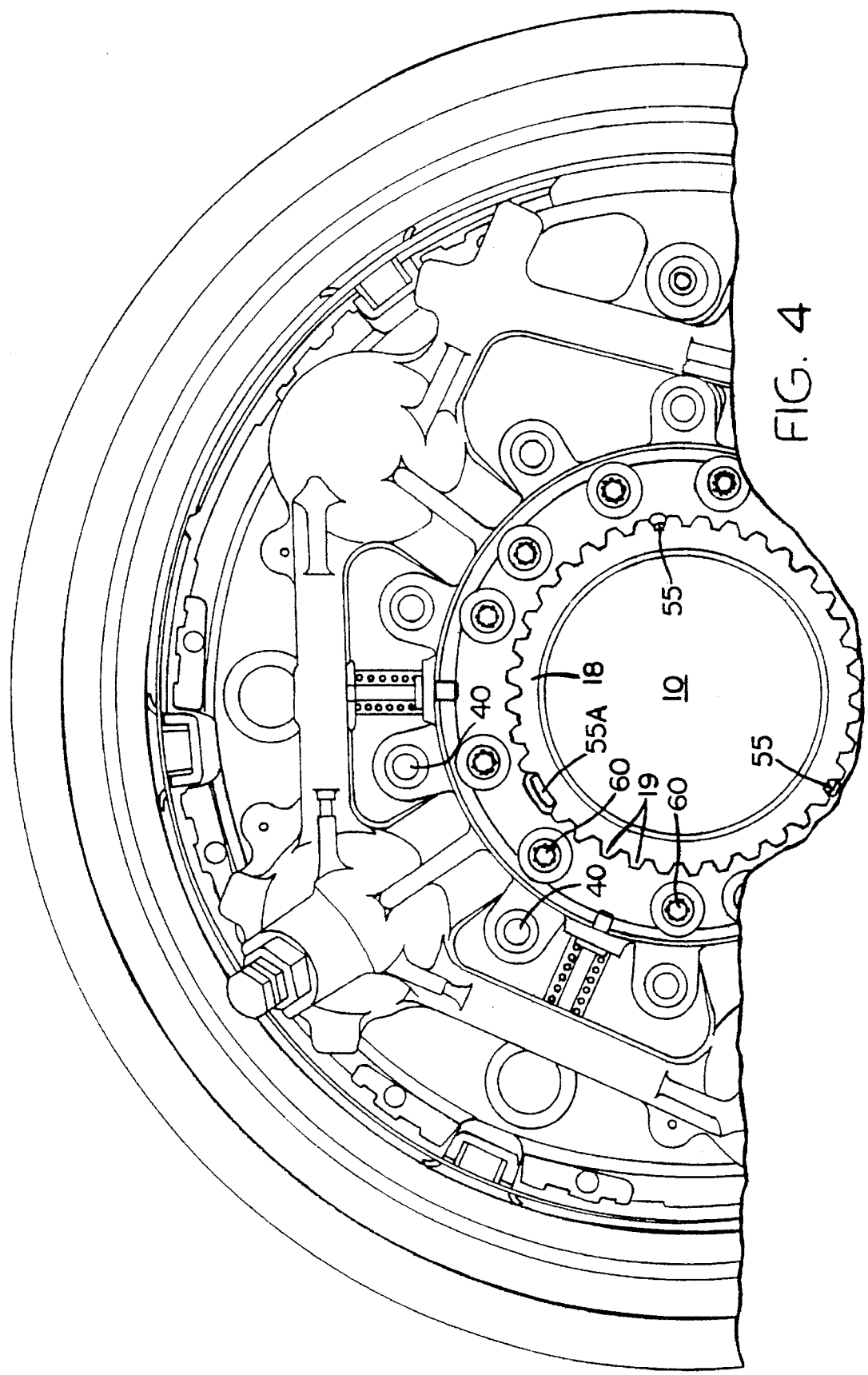
FIG. 4 is an end view of the piston housing, retention ring, axle and wheel of FIG. 3.

Aircraft brake 30 includes a plurality of rotors (discs) 34 connected by typical key or spline connections with wheel 20 and a plurality of stators (discs) 36 connected by key or spline connections with torque tube 24. Brake 30 includes piston housing 35 attached by a plurality of bolts 40 (see FIG. 4) to torque tube 24. Brake 30 includes heat shield 70. FIG. 3 illustrates the torque transfer assembly which includes the stator discs 36, torque tube 24, piston housing 35, axle flange 18 and the retention ring 50 connected by bolts 60 to the torque tube radial flange 29. In order to transfer braking torque from the torque tube to the axle, the torque tube 24 is connected with the axle flange 18 via an abutting engagement. A plurality of bolts 60 and threaded shafts 63 extend through ring openings 52 (see FIGS. 3 and 5) and torque tube openings 27 (FIG. 3) to attach, via nuts 64, the retention ring 50 to the radial flange 29 of torque tube 24. The abutting engagement is effected by the retention ring 50 including an internal, annular opening 51 (see FIG. 5) which has a plurality of teeth means or splines 54 about the circumference thereof. The axle flange 18 includes about its circumference a plurality of teeth means or splines 19 (see FIG. 4) which mate or mesh with the teeth means or splines 54 of retention ring 50. Because a plurality of teeth means or splines is utilized to engage a corresponding plurality of teeth means or splines, there is a significant increase in surface-to-surface contact between the parts of the retention ring 50 and axle flange 18 which engage one another. As a result of the significant increase and surface interfaces which abut one another, an improved load distribution connection is effected between the respective parts.

Retention ring 50 includes a plurality of axial engagement members or "dogs" 55 which comprise three members that enable quick assembly and disassembly with axle flange 18. Members 55, which include double circumferential size member 55A, enable easy alignment and engagement between teeth means or splines 19 and 54 as members 55 find complementary shaped spaces in the flange 18. Members 55 effect circumferential orientation or clocking of ring 50 to prevent misalignment relative to axle flange 18.

Retention ring 50 is preferably made of copper beryllium. As compared to aluminum, titanium, nickel alloys and corrosion resistant steel, copper beryllium from Brush Wellman Inc. was found to have the best combination of low modulus, elongation and high strength as well as inherent corrosion resistance and resistance to galling and fretting.

The aircraft brake torque transfer assembly of the present invention provides an improved connection of the torque tube with the axle via the axle flange. Prior connections of the torque tube with the axle flange comprised generally a bolt having an enlarged head which abutted a radial surface of the axle flange and a nut which abutted an axially opposite radial surface of the torque tube foot, or vice versa. Because the bolt and nut connection exerted compression between the axle flange and torque tube foot, braking torque being transferred from the torque tube foot to the axle flange effected the transfer via a shear/friction joint. In other words, the shear/friction joint resulted from the bolt head and shank and the nut being relatively inflexible and the braking torque being exerted on the shaft of the bolt at the interface between the axle flange and the torque tube foot. This would cause bending of the bolt shaft and result in an enlargement or ovalization of the opening in the torque tube foot, because the torque tube is typically made of titanium which is softer than the metal material of the axle flange. The present invention eliminates the compressive force exerted between the bolt head and nut upon both the axle flange and torque tube foot via a shear/friction joint, by providing a retention ring which is bolted to the torque tube and which has teeth or splines which mesh abuttingly with teeth or splines about the circumference of the axle flange 18. As a result, should there be any wear of the retention ring 50 or bolts 60, the retention ring and bolts are easily and inexpensively replaced while the torque tube 24 may continue to be used. The retention ring and axle flange provide reduced stress on the faces of the teeth means or splines to effect better load distribution because a softer part (ring) engages a harder part (axle flange). Also there is a major diameter fit whereby the tip or top land of a flange tooth engages or contacts the bottom land of the retention ring so that radial loads are transferred through the major diameters of the ring and axle flange. Such a fit is a desirable feature for carrier based aircraft which experience bump stop loads wherein the momentarily deformed wheel contacts the piston housing.

We claim:

1. A brake torque transfer assembly of a brake, comprising axle means upon which is mounted rotatably a wheel via bearing means, the brake comprising a torque tube maintained at a predetermined axial position adjacent an axle flange of said axle means, a piston housing connected with said torque tube, at least one disc member connected with said torque tube, at least a second disc member connected with said wheel, and the torque tube located nonrotatably relative to the axle means via a retention ring connected with the torque tube and engaging nonrotatably the axle flange of said axle means, the retention ring having internal teeth means engaging teeth means at the circumference of said axle flange, the teeth means of the retention ring and the axle flange comprising a plurality of splines, the splines of the retention ring being located about a circumference of a central opening of the retention ring, detachable means for connecting the retention ring with said torque tube, the detachable connecting means comprising a bolt and nut with the bolt extending through aligned openings in the retention ring and torque tube, and the aligned openings in the torque tube located within a torque tube radial flange which extends to a torque tube foot positioned about the axle means.

2. The assembly in accordance with claim 1, wherein the retention ring includes a plurality of axially extending engagement members which extend axially from positions adjacent to the central opening.

3. The assembly in accordance with claim 2, wherein one opening between two of the splines of the axle flange and one of the engagement members are each approximately twice the circumferential width of the other openings between the splines of the axle flange and other engagement members, respectively.

4. The assembly in accordance with claim 3, further comprising shim means located at an interface between the torque tube and retention ring and axle flange.

5. The assembly in accordance with claim 1, wherein the retention ring is made of copper beryllium.

6. A brake torque transfer assembly of a brake, comprising axle means upon which is mounted rotatably a wheel via bearing means, the brake comprising a torque tube having a torque tube radial flange and torque tube foot and maintained at a predetermined axial position adjacent a radial axle flange of said axle means, a piston housing connected with said torque tube, at least one disc member connected with said torque tube, at least a second disc member connected with said wheel, and the torque tube located nonrotatably relative to the axle means via a retention ring connected with the torque tube and engaging nonrotatably the axle flange of said axle means, the retention ring disposed radially outwardly relative to the axle flange and separate from the torque tube radial flange and torque tube foot, the retention ring being axially situated relative to the torque tube flange, and the retention ring having internal teeth means engaging teeth means at the circumference of said axle flange.

7. The assembly in accordance with claim 6, wherein the teeth means of the retention ring and the axle flange comprise a plurality of splines, the splines of the retention ring being located about a circumference of a central opening of the retention ring.

8. The assembly in accordance with claim 7, further comprising detachable means for connecting the retention ring with said torque tube.

9. The assembly in accordance with claim 8, wherein the detachable connecting means comprises a bolt and nut with the bolt extending through aligned openings in the retention ring and torque tube.

10. The assembly in accordance with claim 9, wherein the aligned openings in the torque tube are located within the torque tube radial flange which extends to the torque tube foot positioned about the axle means.

11. The assembly in accordance with claim 7, wherein the retention ring includes a plurality of axially extending engagement members which extend axially from positions adjacent to the central opening.

12. The assembly in accordance with claim 11, wherein one opening between two of the splines of the axle flange and one of the engagement members are each approximately twice the circumferential width of the other openings between the splines of the axle flange and other engagement members, respectively.

13. The assembly in accordance with claim 12, further comprising shim means located at an interface between the torque tube and retention ring and axle flange.

14. The assembly in accordance with claim 6, wherein the retention ring is made of copper beryllium.

* * * * *